(12) United States Patent
Makino et al.

(10) Patent No.: US 6,608,397 B2
(45) Date of Patent: Aug. 19, 2003

(54) WIND DRIVEN ELECTRICAL POWER GENERATING APPARATUS

(75) Inventors: Tomoaki Makino, Shizuoka-ken (JP); Takashi Nozaki, Shizuoka-ken (JP); Yutaka Tanigaki, Osaka-fu (JP); Masuo Takaki, Osaka-fu (JP)

(73) Assignee: NTN Corporation, Osaka-fu (JP)

( * ) Notice: Subject to any disclaimer, the term of this patent is extended or adjusted under 35 U.S.C. 154(b) by 66 days.

(21) Appl. No.: 09/985,636

(22) Filed: Nov. 5, 2001

(65) Prior Publication Data

US 2002/0053802 A1 May 9, 2002

(30) Foreign Application Priority Data

Nov. 9, 2000 (JP) ........................................ 2000-342132
Nov. 15, 2000 (JP) ........................................ 2000-348723

(51) Int. Cl.⁷ ................................................. F03D 7/00
(52) U.S. Cl. ........................................... 290/44; 290/55
(58) Field of Search ............................ 290/43, 44, 54, 290/55

(56) References Cited

U.S. PATENT DOCUMENTS

| | | | | |
|---|---|---|---|---|
| 4,461,957 A | * | 7/1984 | Jallen ........................... | 290/44 |
| 4,525,633 A | * | 6/1985 | Wertheim et al. .............. | 290/44 |
| 4,613,760 A | * | 9/1986 | Law ............................. | 290/1 C |
| 4,700,081 A | * | 10/1987 | Kos et al. ...................... | 290/44 |
| 5,083,039 A | * | 1/1992 | Richardson et al. ........... | 290/44 |
| 5,140,170 A | * | 8/1992 | Henderson .................... | 290/44 |
| 2002/0117861 A1 | * | 8/2002 | Kim et al. ..................... | 290/54 |

* cited by examiner

Primary Examiner—Nicholas Ponomarenko
(74) Attorney, Agent, or Firm—Arent Fox Kinter Plotkin & Kahn

(57) ABSTRACT

A wind driven electrical power generating apparatus includes a rotor rotating by receiving wind force, a gear assembly having an input shaft connected to the rotor, a generator connected to an output shaft of the gear assembly, a sensor for detecting generating capacity of the generator and a controller for varying gear ratio of the gear assembly based on a signal from the sensor. In this construction, the controller controls so that the generator keeps rotating at around the lowest rotational speed within a range of rotational speed, the range being determined so as to include a maximum power operation region of the generator. Alternatively, the controller controls so that rotational speed of the output shaft of the gear assembly is adjusted to at around the lowest rotational speed within a range of rotational speed, the range being determined so as to include a rated power region as an upper operational limit.

4 Claims, 13 Drawing Sheets

WIND DRIVEN ELECTRICAL POWER GENERATING APPARATUS

BACKGROUND OF THE INVENTION

1. Field of the Invention

The present invention relates to a wind driven electrical power generating apparatus for driving a generator by rotating a rotor utilizing wind force. Particularly, the present invention relates to a wind driven electrical power generating apparatus for controlling a gear assembly, which connects a rotor and a generator, so that the apparatus operates for a long period of time and at the same time, at optimal power-conversion efficiency. Furthermore, this invention relates to an improvement of a gear assembly employed in a wind driven electrical power generating apparatus and interposed between a rotor and a generator so as to decrease or increase an input rotational speed.

2. Description of the Related Art

A wind driven electrical power generating apparatus utilizing wind force converts the kinetic energy of wind to drive force by using a rotor such as propeller-type rotor and the like, which rotates by receiving the wind force, and then drives a generator by using the drive force, resulting in the conversion of the wind force to electrical energy. As is seen in the above-described mechanism of the wind power conversion process, the wind driven electrical power generating apparatus fundamentally depends on wind, one of natural phenomena, and therefore, the output electrical energy of the apparatus drastically fluctuates depending on the natural condition of not only the day but also the time. When wind speed varies, the rotational speed of a rotor also varies in accordance with the change of the wind speed, leading to the change of the rotational speed of a generator, and finally resulting in the fluctuation of the electrical energy to be generated.

Conventionally, there have been proposed various techniques to improve a wind driven electrical power generating apparatus. Among those techniques, Japanese Patent Laid-Open Publication No. Hei. 2-157483 discloses the following technique. That is, a gear assembly is interposed between a rotor and a generator such that the input shaft of the gear assembly is connected to the rotor and the output shaft of the gear assembly is connected to the rotating shaft of the generator, and by adjusting the gear ratio of this gear assembly, the rotational speed of the output shaft is controlled to be within a predetermined range of rotational speed regardless of the rotational speed change of the rotor. In addition, Japanese Patent Laid-Open Publication No. Sho. 62-129578 discloses the following technique. That is, the pitch of rotor blades is made to be variable and can be controlled in accordance with wind speed so as to always rotate a generator within a predetermined range of rotational speed.

SUMMARY OF THE INVENTION

It is an object of the present invention to provide a wind driven electrical power generating apparatus capable of operating at optimal power-conversion efficiency and elongating the life of the power generating apparatus.

According to one aspect of the invention, a wind driven electrical power generating apparatus includes a rotor rotating by receiving wind force, a gear assembly connected via an input shaft thereof to the rotor, a generator connected to an output shaft of the gear assembly, a sensor for detecting a generating capacity of the generator, and a controller for varying a gear ratio of the gear assembly in accordance with a signal from the sensor to control the generator to keep rotating at around the lowest rotational speed within a range of rotational speed, the range being determined so as to include a maximum power operation region of the generator.

According to another aspect of the invention, a wind driven electrical power generating apparatus includes a rotor rotating by receiving wind force, a gear assembly connected via an input shaft thereof to the rotor, a generator connected to an output shaft of the gear assembly, a sensor for detecting parameters representing an output power of the generator, and a controller for varying a gear ratio of the gear assembly in accordance with a signal from the sensor to control the output shaft of the gear assembly to rotate at around a lowest rotational speed within a range of rotational speed, the range being determined so as to include a rated power region as an upper operational limit.

That is, by controlling the gear ratio of the gear assembly for the generator to operate within a range of power limited to its rated power as an upper operational limit, the generator becomes capable of generating its maximum electrical power and at the same time, can be prevented from rotating at a higher rotational speed than required for outputting its maximum power, whereby the life of the generator is elongated. Note that an operational limit on usage of a generator under specified conditions is referred to as rating and usually represented by output power referred to as rated power. In other words, the rated power of generator means maximum generating capacity of the generator under operation. Parameters featuring the output power of generator include rotational speed, current, voltage, electrical power and the like. Therefore, to the sensor of the apparatus can be applied a sensor suitable for the parameter to be detected.

The wind driven electrical power generating apparatus of the present invention has the following configuration. That is, the rotor and the generator are connected to each other via the gear assembly, and the controller for varying the gear ratio of the gear assembly based on a detected signal from the sensor, which detects parameters representing the output power of the generator, is provided. The controller adjusts the output shaft of the gear assembly to rotate at around the lowest rotational speed within a range of rotational speed, the range including a rated power region as an upper operational limit. Therefore, the generator of the apparatus is capable of always outputting the electrical power approximately equal to the rated power at optimal efficiency and at the same time, the rotational speed of the generator is limited to around a lowest rotational speed needed for the generator to output the above-described electrical power, whereby the life of the generator is elongated.

Various known types of gear assemblies can be employed as the gear assembly of the present invention. For example, a belt pulley type gear assembly, a planetary toothed-wheel type gear assembly and a traction drive type transmission can be available. Furthermore, the gear assembly to be employed in the apparatus is not necessarily to be a continuously variable gear assembly but may be a multi-stage gear assembly.

According to still another aspect of the present invention, a gear assembly for a wind driven electrical power generating apparatus includes:

a casing;

an input shaft rotatably supported in the casing;

an output shaft rotatably supported in the casing;

a sun roller rotating with the output shaft;

an outer ring disposed coaxially with the sun roller; and a plurality of kinds of roller groups disposed in a radial direction in a space formed between the sun roller and the outer ring, and being frictionally engaged with the sun roller and the outer ring, in which each of the roller groups is rotatably disposed at equal intervals in a circumferential direction, the roller groups are disposed being stacked one above another in a radial direction in a multi-stage fashion, and each roller belonging to at least one roller group selected from the roller groups has rollers constructed of a plurality of cylinders to have two raceway surfaces having different rotational radiuses. According to the above-described configuration of the gear assembly, all the roller groups are arranged within the same plane. Therefore, compared with the above-mentioned conventional gear assembly configuration in which two gear assemblies are disposed in series in an axial direction, the gear assembly of the present invention can achieve the gear ratio equivalent to that of the two gear assemblies in such a compact and space saving manner as smaller dimension in an axial direction. Furthermore, the outer ring may be integrally formed as one-piece structure with the casing. Thus, the number of parts needed for gear assembly can be reduced and further reduction of dimension of gear assembly in a radial direction can be achieved. According to the present invention, in addition to the achievement of high gear ratio, a lightweight and compact wind driven electrical power generating apparatus can be provided. That is, all the roller groups are arranged within the same plane. Therefore, compared with the above-mentioned conventional gear assembly configuration in which two gear assemblies are disposed in series in an axial direction, the gear assembly of the present invention can achieve the gear ratio equivalent to that of the two gear assemblies in such a compact and space saving manner as smaller dimension in an axial direction.

In this construction, the gear assembly may be configured in such a manner that the outer ring rotates with the input shaft and each roller belonging to the roller group being frictionally engaged with the outer ring is rotatably supported on a pin fixed to the casing.

Furthermore, the gear assembly may be configured in such a manner that the outer ring is made not to rotate, and each roller belonging to the roller group being frictionally engaged with the outer ring is rotatably mounted on a carrier provided on the input shaft.

Furthermore, the gear assembly may be configured in such a manner that the outer ring is made not to rotate, and the input shaft and each roller belonging to the roller group being frictionally engaged with the outer ring constitute a toothed-wheel transmission mechanism. Although the traction drive is featured by low vibration and low noise, it utilizes rolling and sliding contact mechanism and therefore, the transmissibility is inferior compared to that of a toothed-wheel transmission mechanism. Since the rotational speed of an input side (a rotor side) is low, even when the traction drive is replaced by the toothed-wheel in the apparatus, vibration and noise do not become so serious problems. Taking into account of such features seen in the two mechanisms, the gear assembly is made to be configured so that the input side rotating at a low speed employs a toothed-wheel and the output side needed to rotate in a high speed employs a traction drive, and thus, the power transmissibility of gear assembly is improved and the power received from the rotor can be transmitted to the generator without loss. The above-stated effect is achieved even in the modified conventional technique. That is, out of the two-stage planetary rollers disposed in series in an axial direction in the gear assembly described in Japanese Patent Laid-Open Publication No. Hei. 5-79450, the input side (the rotor side) planetary rollers are replaced by planetary toothed-wheels. However, according to the present invention, a gear assembly having the same effect as that of the modified conventional technique can be realized in an axial direction dimension in a more compact manner than the gear assembly configured to be arranged in two-stage in series in an axial direction.

Furthermore, the gear assembly and the generator may be made to be of one-piece structure. For example, the sun roller can be directly connected to the rotating shaft of the generator. Thus, the output shaft can be omitted and at the same time, the bearing for supporting the output shaft also can be omitted. Furthermore, a part of the casing of the gear assembly can be configured to be commonly formed with the generator casing, thereby realizing the wind driven electrical power generating apparatus wholly in a space saving manner.

Hereinafter, preferred embodiments of the present invention will be explained with reference to the drawings.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 1A:
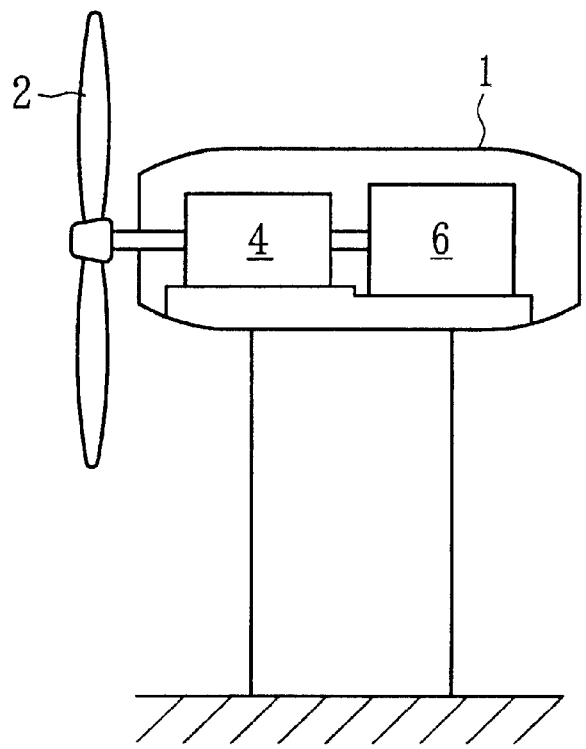
FIG. 1A is a schematic elevation of a wind driven electrical power generating apparatus according to a preferred embodiment of the present invention.
Figure 1B:
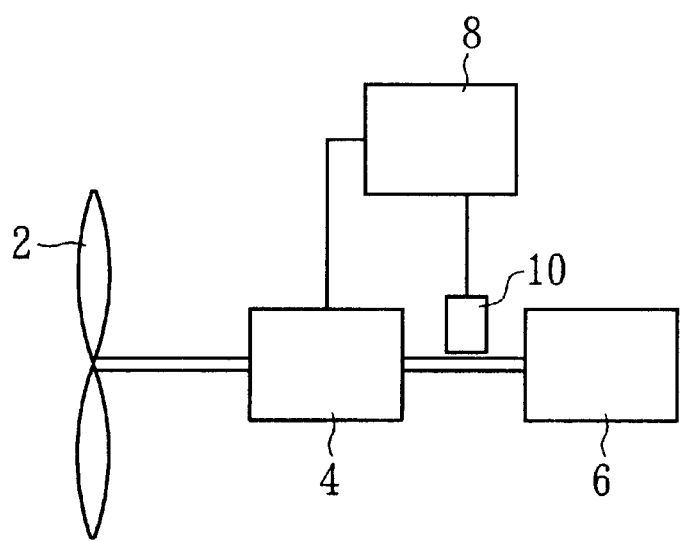
FIG. 1B is a block diagram of the wind driven electrical power generating apparatus shown in FIG. 1A.

As shown in FIGS. 1A and 1B, a wind driven electrical power generating apparatus comprises a rotor 2, a gear assembly 4 and a generator 6. The rotor 2 is a propeller-type rotor supported on a rotating shaft. The rotating shaft is rotatably supported in a housing 1. The rotating shaft of this rotor 2 is connected to an input shaft of the gear assembly 4. An output shaft of the gear assembly 4 is connected to a rotating shaft of the generator 6. Note that when viewing FIG. 1A from a direction vertical to the plane of the figure, although the left side shaft consisting of the rotating shaft of the rotor 2 and the input shaft of the gear assembly 4, and the right side shaft consisting of the output shaft of the gear assembly 4 and the rotating shaft of the generator 6 are drawn as if the left side and right side shafts constitute one-piece structure or are directly connected to each other, the two shafts may be connected to each other via suitable coupling means or a power transmission mechanism.

In FIG. 1B, numeral 8 denotes a controller. In addition, a sensor 10 for detecting parameters representing the generating power of the generator 6 is provided in the apparatus. For example, the sensor includes a speed sensor capable of detecting the rotational speed of the output shaft of the gear assembly 4 or the rotating shaft of the generator 6, and/or a current meter, a voltage meter, a power meter and the like for detecting the generating power of the generator 6. A signal from the sensor 10 is supplied to the controller 8. Based on this input signal, the controller 8 supplies a control signal to a gear ratio control mechanism within the gear assembly 4 to vary the gear ratio of the gear assembly 4.

Figure 2:
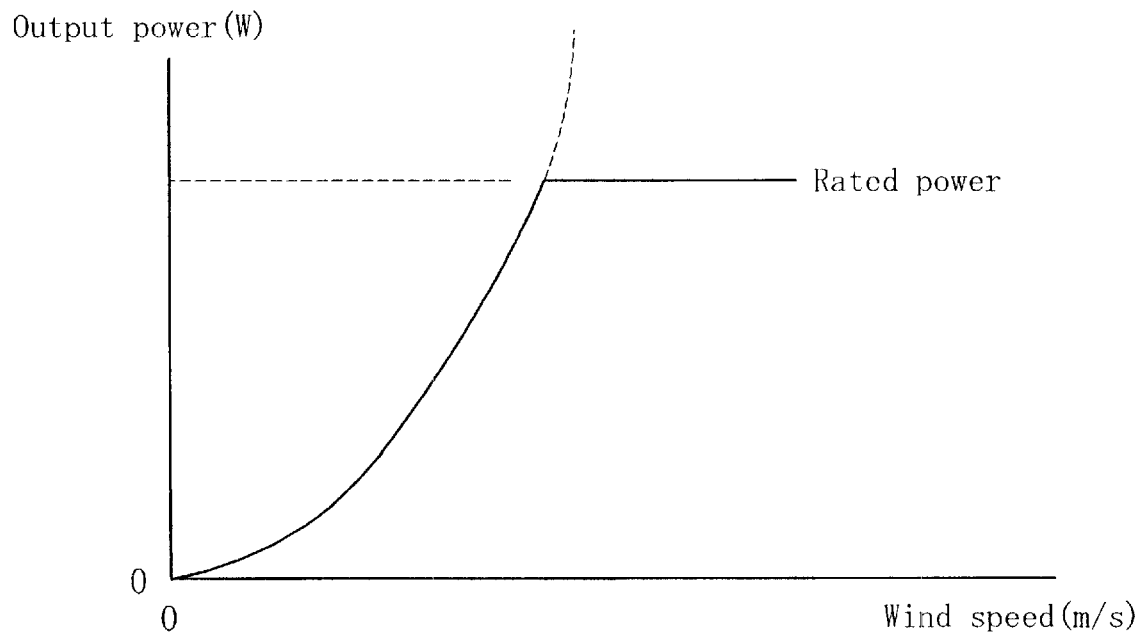
FIG. 2 is an output characteristic chart of the wind driven electrical power generating apparatus shown in FIG. 1A.

FIG. 2 illustrates a characteristic diagram indicating the generating power of the generator 6, in which the axis of abscissa stands for wind speed (m/s) and the axis of ordinate stands for generating output power (W). The controller 8 controls the gear ratio of the gear assembly 4 such that the generator 6 operates at as low rotational speed as possible while securely outputting its maximum power.

In the wind driven electrical power generating apparatus configured above, when the rotational speed of the rotor 2 varies in accordance with the change of wind speed, the controller 8 supplies a signal to a gear ratio control mechanism of the gear assembly 4 to vary the gear ratio of the gear assembly 4 and thus the generator 6 operates always within a desirable range of rotational speed limited to the rated rotational speed as an upper speed limit, whereby the output power of the generator never fluctuates largely. For example, when wind speed is low and the rotational speed of the rotor 2 is low, the speed increasing ratio of the gear assembly 4 is made high. On the contrary, when wind speed is high and the rotational speed of the rotor 2 is high, the speed increasing ratio of the gear assembly 4 is made low. In both cases, the controller 8 controls the gear ratio of the gear assembly 4 so that the generator 6 operates within a desirable range of rotational speed limited to the rated rotational speed as an upper speed limit.

Figure 3:
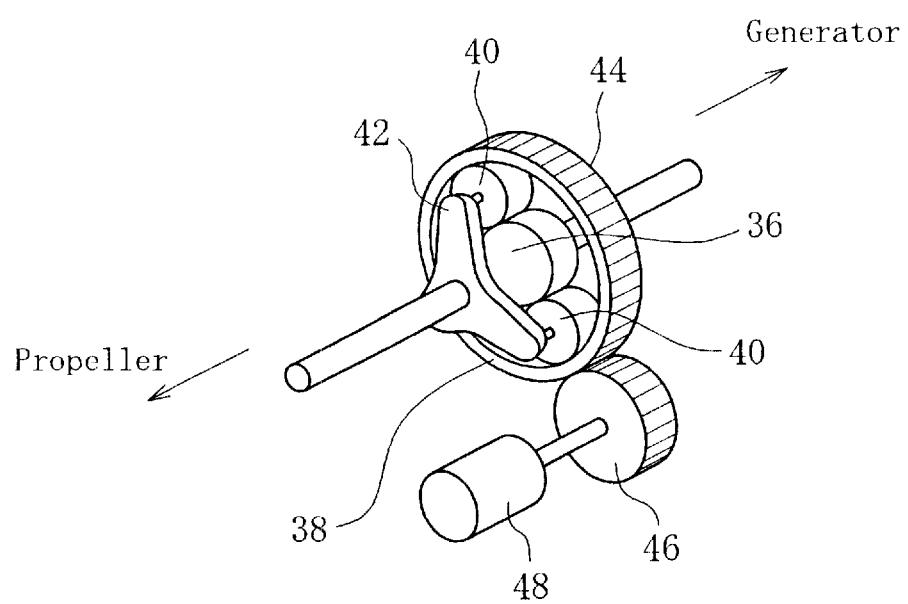
FIG. 3 is a perspective view of a planetary roller type traction drive gear assembly.
Figure 4A:
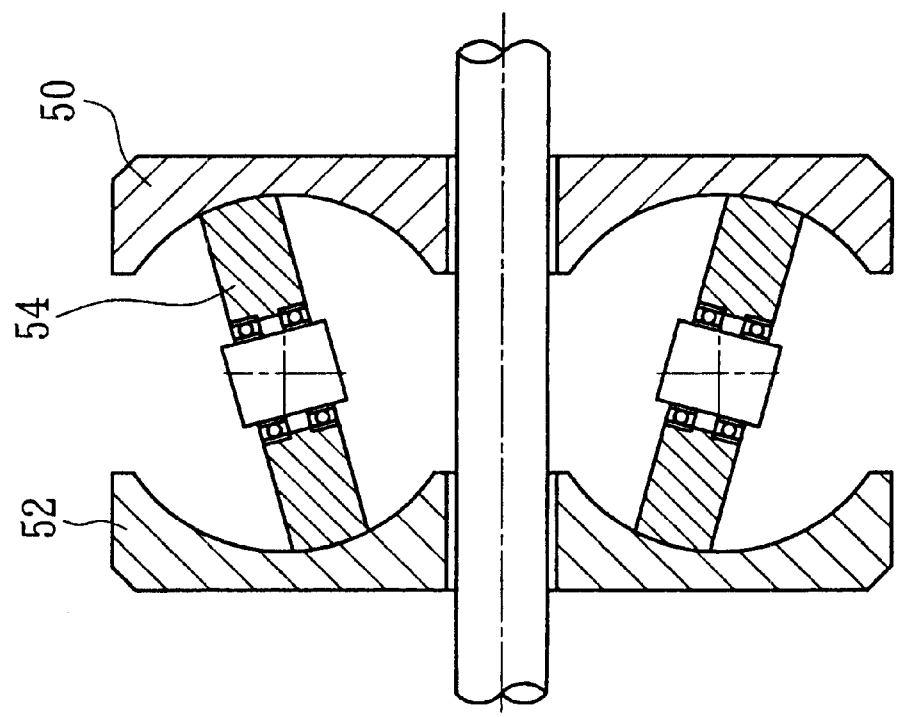
FIGS. 4A and 4B are cross sectional views of a continuously-variable-ratio transmission of the annular-race rolling-traction type.
Figure 4B:
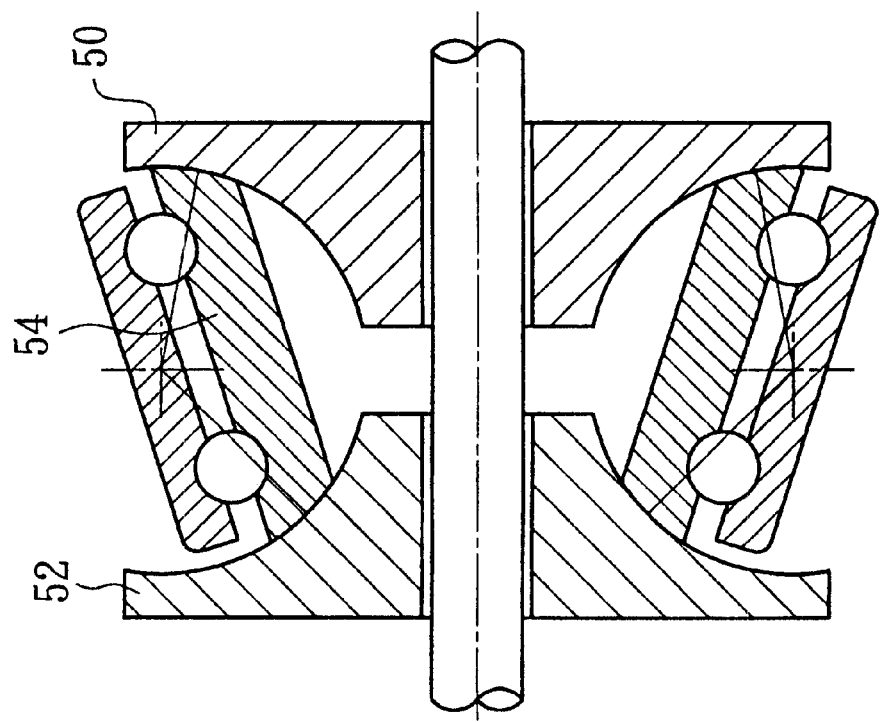
Figure 5:
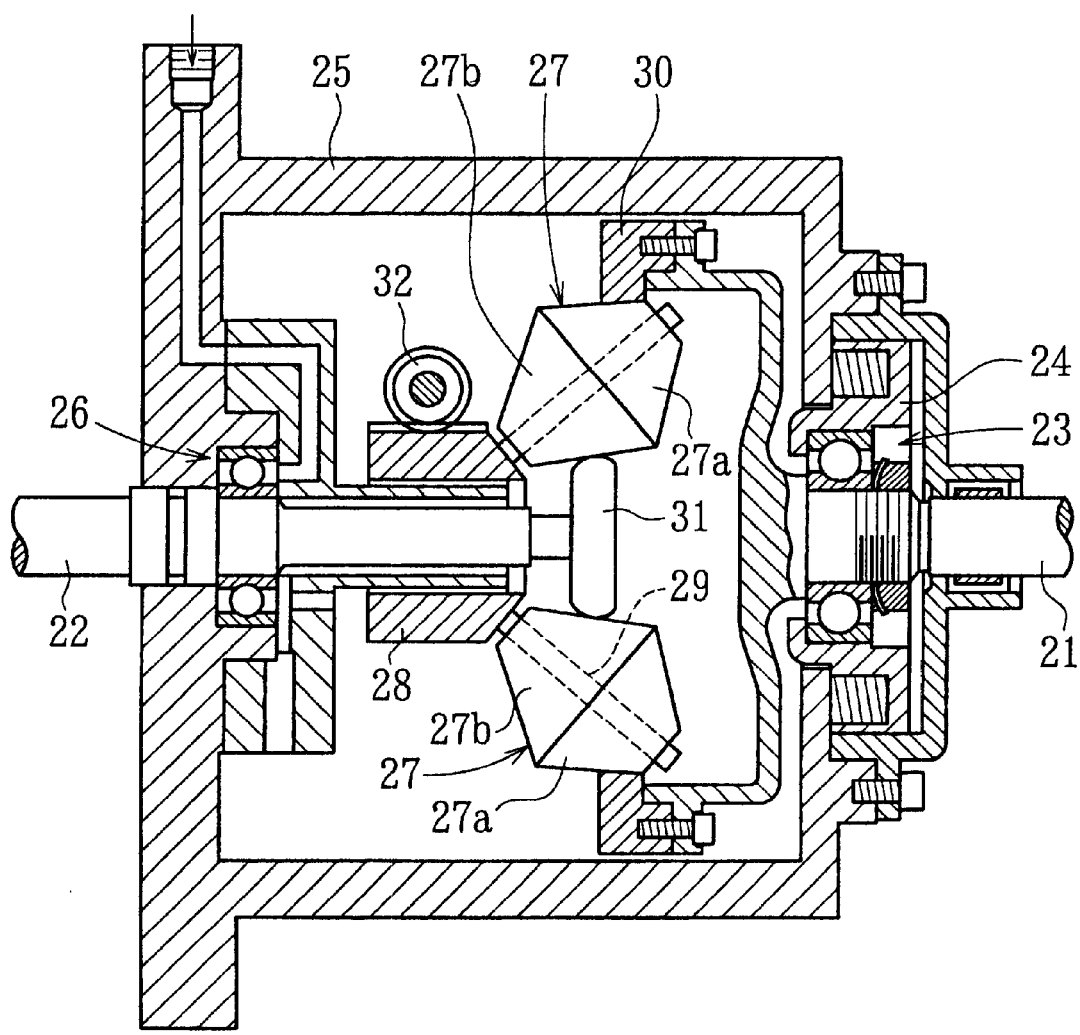
FIG. 5 is a cross sectional view of a continuously-variable-ratio transmission of a cone traction drive type.

FIGS. 3 to 5 illustrate views of a preferred example of the gear assembly 4. FIG. 3 is a perspective view of a planetary roller type traction drive gear assembly. As shown in FIG. 3, an outer ring 38 is disposed coaxially with a sun roller 36 and planetary rollers 40 are sandwiched between and frictionally engaged with the sun roller 36 and the outer ring 38, and a planetary carrier 42 is connected to propellers (not shown). External teeth 44 are formed on the outer periphery of the outer ring 38 and a differential pinion 46 connected to a motor 48 is meshed with the teeth. Thus, the motor 48 is driven in accordance with the output of the sensor (not shown) and as a result, the gear ratio can be controlled.

FIGS. 4A and 4B illustrate views of a preferred example of a continuously-variable-ratio transmission of the toroidal-race rolling-traction type. That is, the transmission is configured that by varying the tilt angle of a roller 54 frictionally engaged with an input disc 50 and an output disc 52, the gear ratio between the input disc 50 and the output disk 52 can be varied. FIG. 4A is for a half-toroidal type transmission and FIG. 4B is for full-toroidal type transmission.

FIG. 5 illustrates a view of a preferred example of a continuously-variable-ratio transmission of cone traction drive type. An input shaft 21 and an output shaft 22 are disposed coaxially and the input shaft 21 is rotatably supported in a casing 25 via a shaft bearing 23 and a holder 24, and the output shaft 22 is supported in the casing 25 via a shaft bearing 26. A plurality of double cones 27 disposed in the peripheral space near the output shaft 22 within the casing 25 are rotatably mounted on support shafts 29 of a carrier 28 disposed movable along the output shaft 22. On the end portion of the input shaft 21 is provided an annular member 30 frictionally engaged with one cone surface 27a of the double cone 27 and on the end portion of the output shaft 22 is provided a cone 31 frictionally engaged with the other cone surface 27b of the double cone 27. The cone surfaces 27a and 27b of the double cone 27, the annular member 30 and the cone 31 have the operational and structural relationship with each other described as follows: the annular member 30 and the cone 31 act pressing on the frictional contact surfaces of the double cone 27; and as a result of the pressing force, axial forces as reaction force are generated in the input shaft 21 and the output shaft 22, respectively, such that the two axial forces pull each other. Therefore, the rotational force of the input shaft 21 is transmitted to the double cone 27 via the annular member 30 and then the rotational force of the double cone 27 is taken out to the output shaft 22 via the cone 31. In addition, by moving the double cone 27 along the axis of the output shaft 22 via a conveyor 32 sequentially moved to engagement with the carrier 28, the rotational speed of the output shaft 22 can be changed.

Generally, as the rotational speed of a rotor of wind driven electrical power generating apparatus is low, the apparatus employs a speed-increasing gear taking into account of the generating efficiency of generator. One of typified traction drive type transmission apparatus having a constant gear ratio is a planetary roller type power transmission apparatus, in which wheels constituting a planetary toothed-wheel are replaced by rollers or ring-shaped members. The transmission apparatus is composed of a sun roller as a high-speed rotating shaft, an outer ring disposed coaxially with the sun roller, a plurality of planetary rollers disposed in a space formed between the sun roller and the outer ring, and a carrier as a low-speed rotating shaft to rotatably support the planetary rollers at equal intervals in a circumferential direction. The above-described planetary roller type power transmission apparatus is classified into two major apparatuses depending on the manner in which planetary rollers and a carrier are frictionally engaged with each other. That is, one is configured that a carrier is frictionally engaged with the inner circumferential surface of annular-shaped planetary rollers and the other is configured that a carrier is frictionally engaged with the outer circumferential surface of planetary rollers. In both types, the rotational force is transmitted between the sun roller and the carrier by making the outer ring not to rotate in a circumferential direction.

In a pair of planetary roller type power transmission apparatuses described above, although it is theoretically possible that the gear ratio of a gear assembly represented by an equation, [(rotational speed of high-speed rotating shaft)/(rotational speed of low-speed rotating shaft)], is made equal to or greater than ten, it is usually made equal to three to six for balancing one bearing stress between the frictional surfaces of the sun roller and the planetary rollers, and the other bearing stress between the frictional surfaces of the outer ring and the planetary rollers. To make the gear ratio greater than the above-described usual value, it is proposed that two sets of planetary rollers are disposed in series in an axial direction (Japanese Patent Laid-Open Publication No. Hei. 5-79450).

Such a conventional technique disclosed in the publication nearly needs two sets of planetary roller type gear assemblies and the entire space needed for a wind driven electrical power generating apparatus equipped with the gear assemblies becomes enlarged, leading to the occurrence of the problems of heaviness or bulky space occupation of apparatus. Different from other various apparatuses, a wind driven electrical power generating apparatus needs to be installed at high place and therefore, it is required to become smaller and more compact.

In order to overcome the above-described problems, the gear assemblies having configurations illustrated in FIGS. 6 to 14 can be employed in a wind driven electrical power generating apparatus.

Figure 6:
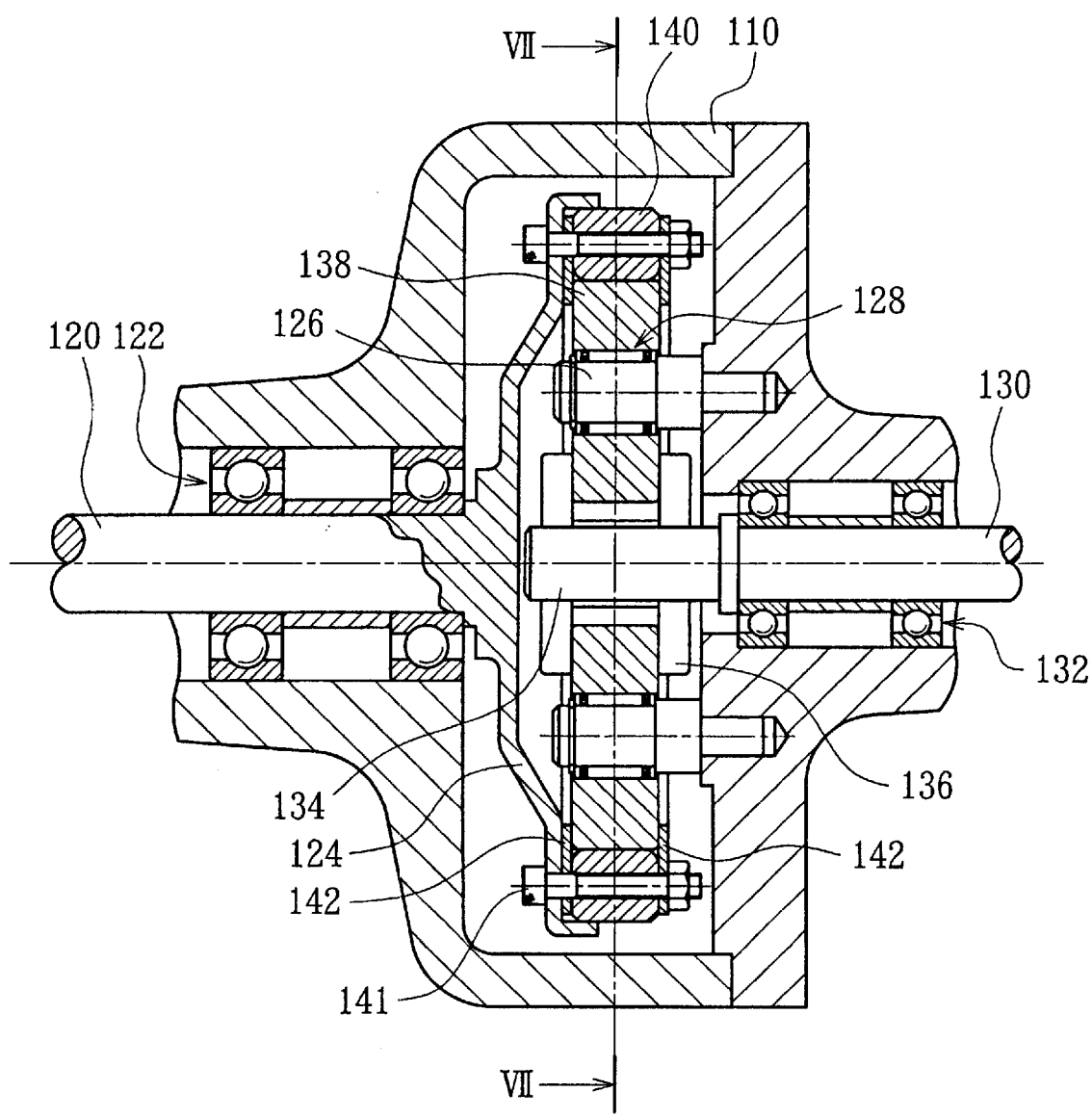
FIG. 6 is a longitudinal cross sectional view of a gear assembly for a wind driven electrical power generating apparatus.
Figure 7:
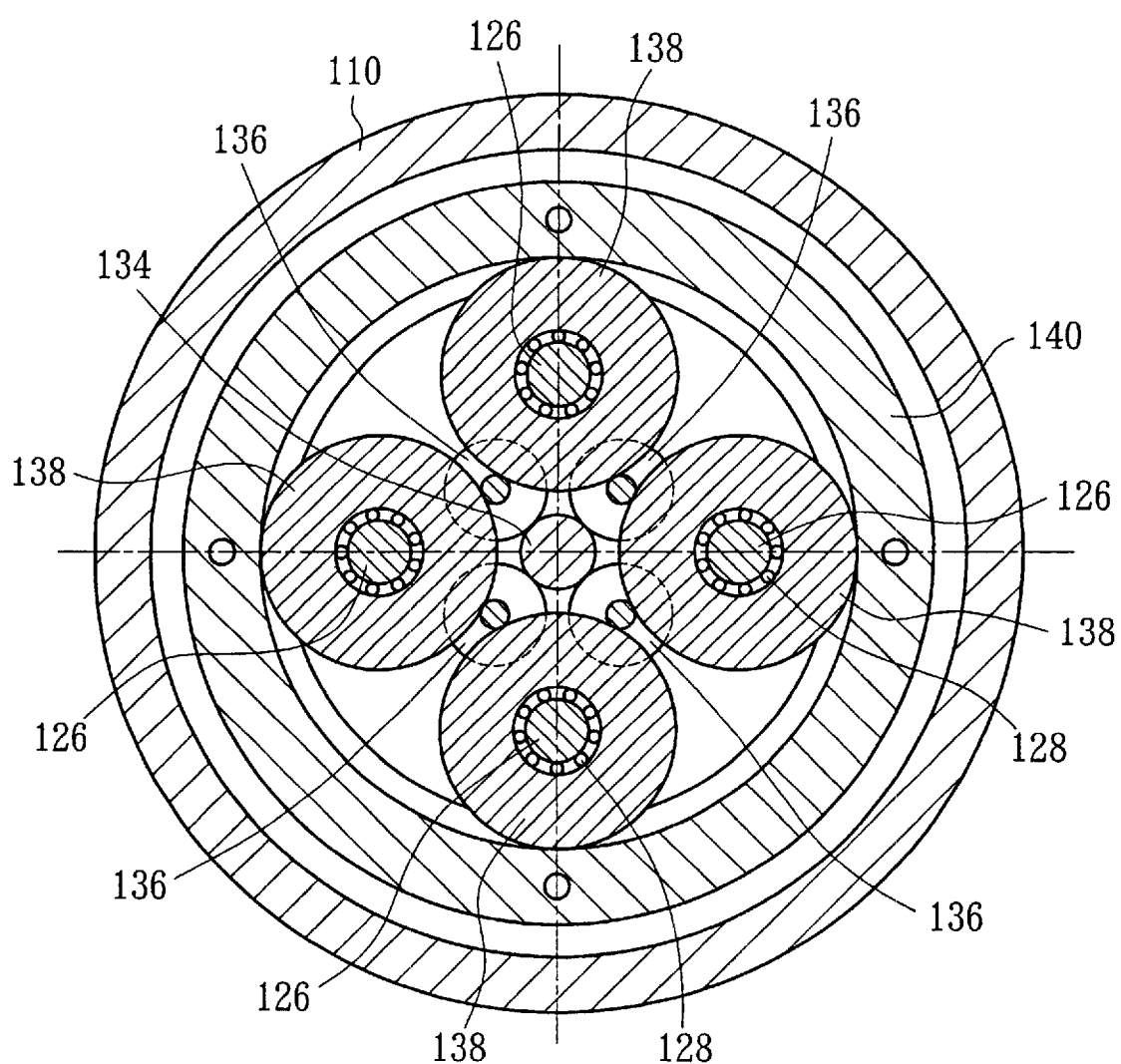
FIG. 7 is a cross sectional view of the structure shown in FIG. 6, taken along the line VII—VII.

First, a gear assembly illustrated in FIGS. 6 and 7 includes a sun roller 134 and an outer ring 140 disposed coaxially with each other, and two kinds of rollers 136 and 138 disposed in the annular space formed between the sun roller 134 and the outer ring 140. The rollers 136 and 138 are configured such that three or more pieces of same kind of rollers are disposed at equal intervals in a circumferential direction and multiple kinds of rollers are disposed in a radial direction (multiple stages). Moreover, at least one kind of rollers disposed along the same circumferential line (at the single stage) consist of a plurality of cylindrical rollers and further two orbital planes having turning radiuses different from one another are formed in the one kind of rollers, whereby a high gear ratio of gear assembly can be obtained.

In this case, between the sun roller 134 and the outer ring 140 are interposed two sets of four pieces of rollers, the two sets consisting of first rollers 136 and second rollers 138, and the first rollers 136 are made being frictionally engaged with the outer circumferential surface of the sun roller 134 and the second rollers 138 are made being frictionally engaged with the inner circumferential surface of the outer ring 140. The first roller 136 is formed so as to have steps and two turning radiuses. The sun roller 134, the outer ring 140, and the first and second rollers 136, 138 are assembled in a pressed and contact state by such means as shrinkage fitting to make a constant normal force act on each frictionally contacting portion regardless of torque to be transmitted.

In addition, an output shaft 130 is rotatably supported in a casing 110 via two pieces of bearings 132. Moreover, there is provided means that prevents the first roller 136 and the second roller 138 from rotating (revolving) around the sun roller 134. For example, a second roller support shaft 126 is mounted in the casing 110 and the second roller 138 is rotatably supported on the second roller support shaft 126 via a needle roller bearing 128. As a result, the second roller 138 is made not to revolve and consequently the first roller 136 is also made not to revolve, whereby the first roller 136 and the second roller 138 only rotate on their axes.

Furthermore, an input shaft 120 is rotatably supported in the casing 110 via two pieces of bearings 122 and the input shaft 120 and the output shaft 130 are disposed coaxially. A carrier 124 is formed integrally with the input shaft 120 at the end portion thereof and the outer ring 140 is fixed to the peripheral portion of the carrier 124 with bolts 141. In this manner, the input shaft 120 and the outer ring 140 are integrated coaxially with each other. Note that in this case, although the input shaft 120 and the outer ring 140 are illustrated so that the two structures are respectively independent pieces and integrated with each other by using bolts 141, the outer ring 140 and the carrier 124 may be formed to be of one-piece structure. In other words, the inner circumferential surface of the peripheral portion of the carrier 124 may be made to be frictionally engaged with the second roller 138.

The gear ratio, $e_1$, of the gear assembly configured above can be represented by the equation, [(rotational speed of the output shaft 130)/(rotational speed of the input shaft 120)], and assume that when the rotational directions of the input shaft 120 and the output shaft 130 are different, the sign of $e_1$ becomes negative. Under the above-stated condition, $e_1$ is represented by the following equation.

$$e_1 = (R_O \times R_{1L})/(R_S \times R_{1S})$$

where: $R_O$ is the inner diameter of the outer ring 140;
$R_{1L}$ is the large outer diameter of the first roller;
$R_{1S}$ is the small outer diameter of the first roller; and
$R_S$ is the outer diameter of the sun roller.

Figure 8:
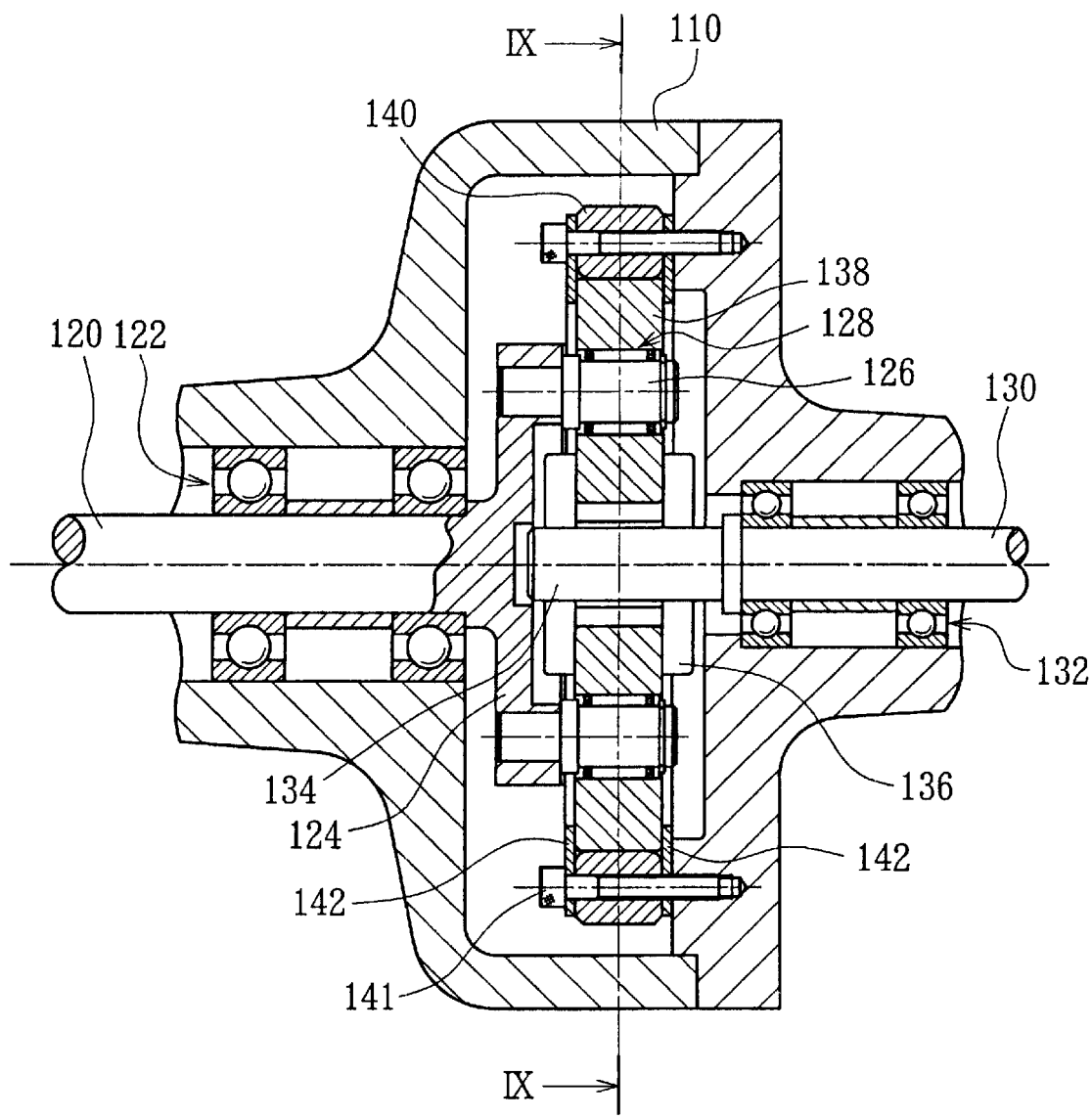
FIG. 8 is a longitudinal cross sectional side view of a gear assembly for the wind driven electrical power generating apparatus.
Figure 9:
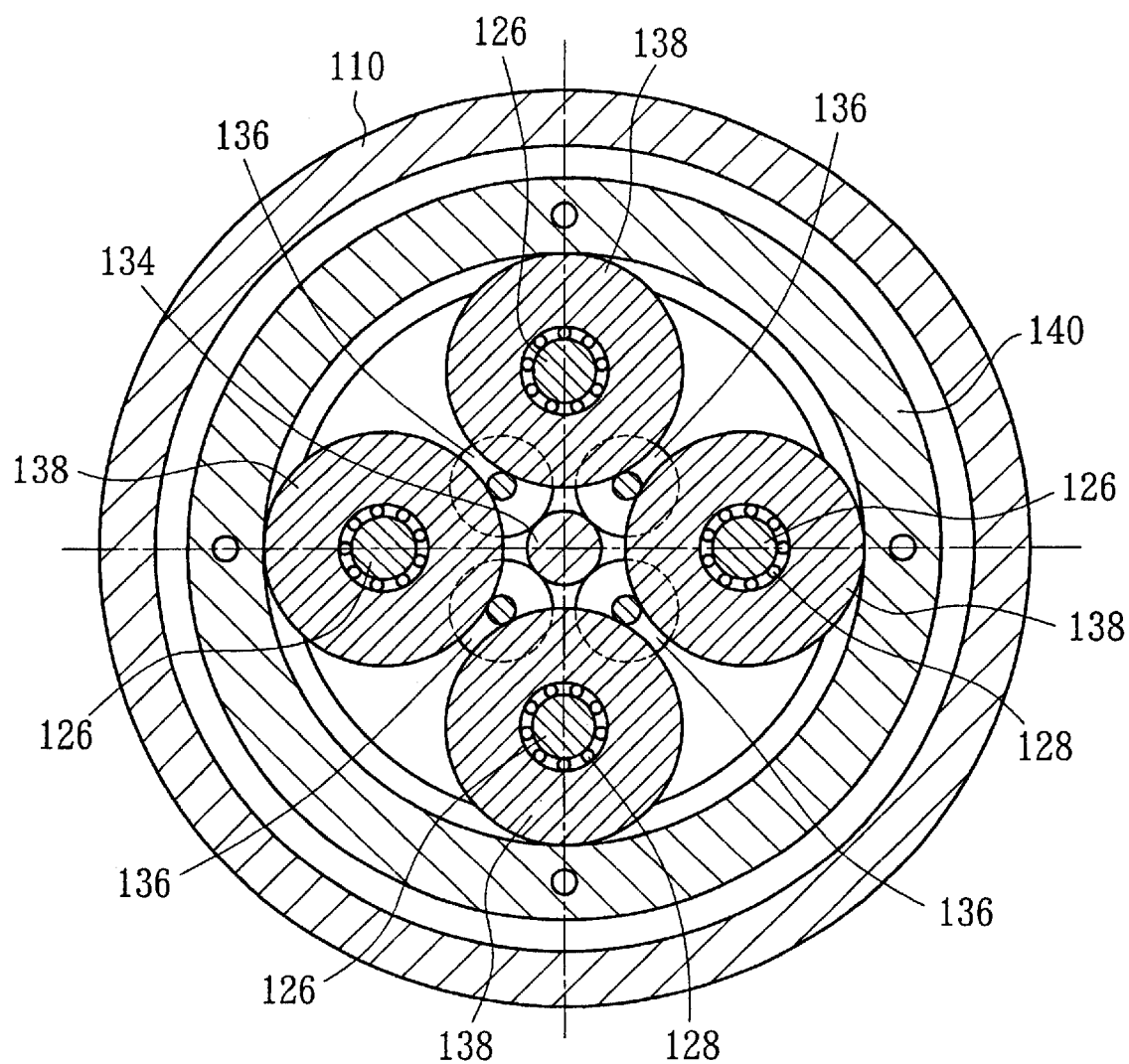
FIG. 9 is a cross sectional view of the structure shown in FIG. 8, taken along the line IX—IX.

Next, FIGS. 8 and 9 show another embodiment of the present invention, particularly, the primary portion of a friction type multi-stage roller gear assembly. It is composed of an input shaft 120 and an output shaft 130 rotatably supported in a casing 110 via bearings 122 and 132, respectively. The input shaft 120 is formed integrally with or coupled to a rotor 2. A carrier 124 is formed integrally with the input shaft 120 at the end portion thereof to hold a second roller 138. The carrier 124 is provided with a plurality of pins, four pieces of pins 126 in this case, at equal intervals in a circumferential direction. The second roller 138 is rotatably supported on each pin 126 via a needle roller bearing 128.

The output shaft 130 is formed integrally with or coupled to the rotating shaft of a generator 6. A sun roller 134 is formed on the end portion of the output shaft 130. An outer ring 140 is disposed coaxially with the sun roller 134 and fixed to the casing 110 with bolts 141. First rollers 136 and second rollers 138 are disposed in the annular space formed between the sun roller 134 and the outer ring 140. The first roller 136 is made being frictionally engaged with the outer circumferential surface of the sun roller 134 and the second roller 138 is made being frictionally engaged with the inner circumferential surface of the outer ring 140. The first and second rollers 136 and 138, four pieces each in this case, are disposed at equal intervals in a circumferential direction. The first roller 136 is formed so as to have steps and two raceway surfaces having two different turning radiuses. The sun roller 134, the outer ring 140, and the first and second rollers 136, 138 are assembled in a pressed and contact state by such means as shrinkage fitting to make a constant normal force act on each frictionally contacting portion regardless of torque to be transmitted.

According to this embodiment, the second roller 138 and the first roller 136 are made to be capable of revolving by fixing the outer ring 140 to the casing 110 not to rotate and further rotatably mounting the second roller 138 on the input shaft 120 so as to be frictionally engaged with the inner circumferential surface of the outer ring 140. Note that a pair of side plates 142 is attached to both side surfaces of the outer ring 140. As the inner diameter of the side plates 142 is shorter than that of the outer ring 140, the side plates acts on the second roller 138 so that the second roller 138 is guided to revolve along the side plates.

By making the first and second rollers 136 and 138 revolve around the sun roller 134, the rotational force between the input shaft 120 and the output shaft 130 is transmitted to each other. In this configuration of the gear assembly of the embodiment, the gear ratio, $e_2$, is represented by the following equation.

$$e_2 = 1 - [(R_O \times R_{1L})/(R_S \times R_{1S})]$$

That is, the gear ratio, $e_2$ is correlated with the gear ratio, $e_1$, of the gear assembly shown in FIGS. 6 and 7 by the following equation regardless of the roller types and the number of rollers.

$$e_1 + e_2 = 1$$

It should be noted that although the embodiment corresponding to FIGS. 8 and 9 employs a friction type two-stage roller gear assembly, the embodiment is not limited thereto, but may employ a friction type three-stage roller gear assembly, or a friction type multi-stage, i.e., greater than or equal to four-stage or more, roller gear assembly.

Figure 10:
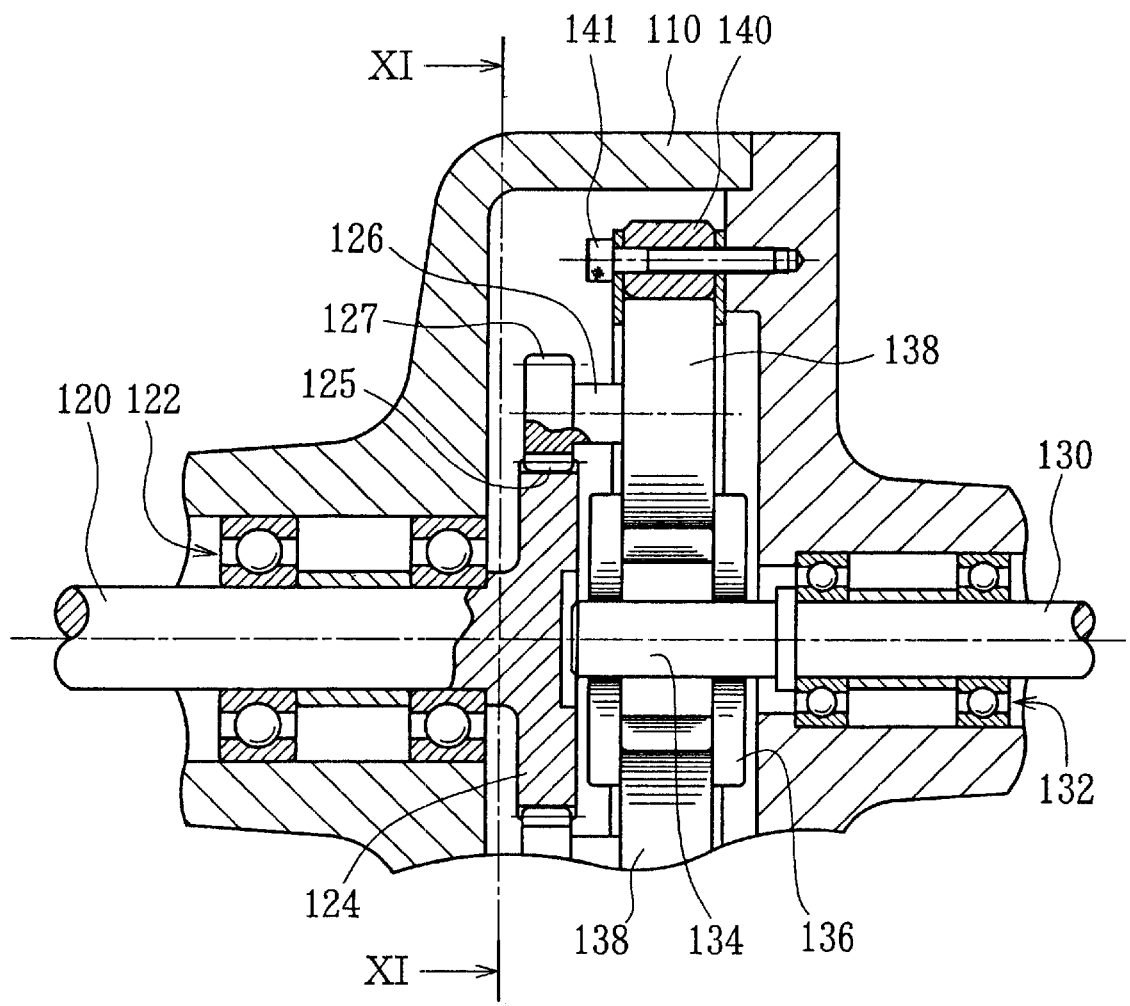
FIG. 10 is a longitudinal cross sectional view of a gear assembly for a wind driven electrical power generating apparatus.
Figure 11:
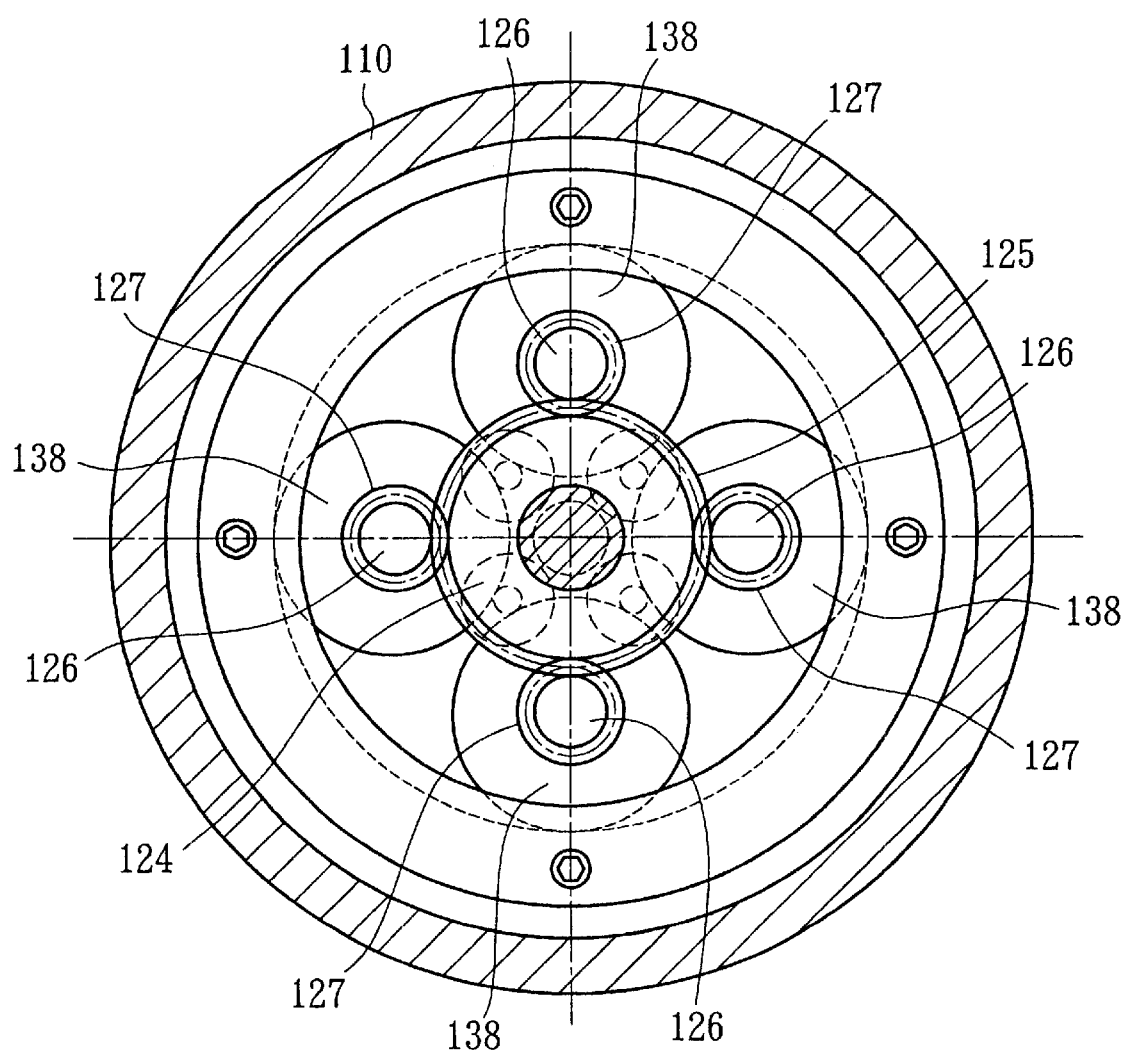
FIG. 11 is a cross sectional view of the structure shown in FIG. 10, taken along the line XI—XI.

In the embodiment shown in FIGS. 10 and 11, a gear assembly includes a toothed-wheel transmission mechanism on the side of a rotor 2 and a traction drive on the side of a generator 6. That is, teeth 125 is formed on the outer circumferential surface of a carrier 124 of an input shaft 120 and at the same time, teeth 127 is also formed integrally with a second roller 138, and the teeth 125 and 127 are thereby meshed with each other.

Figure 12:
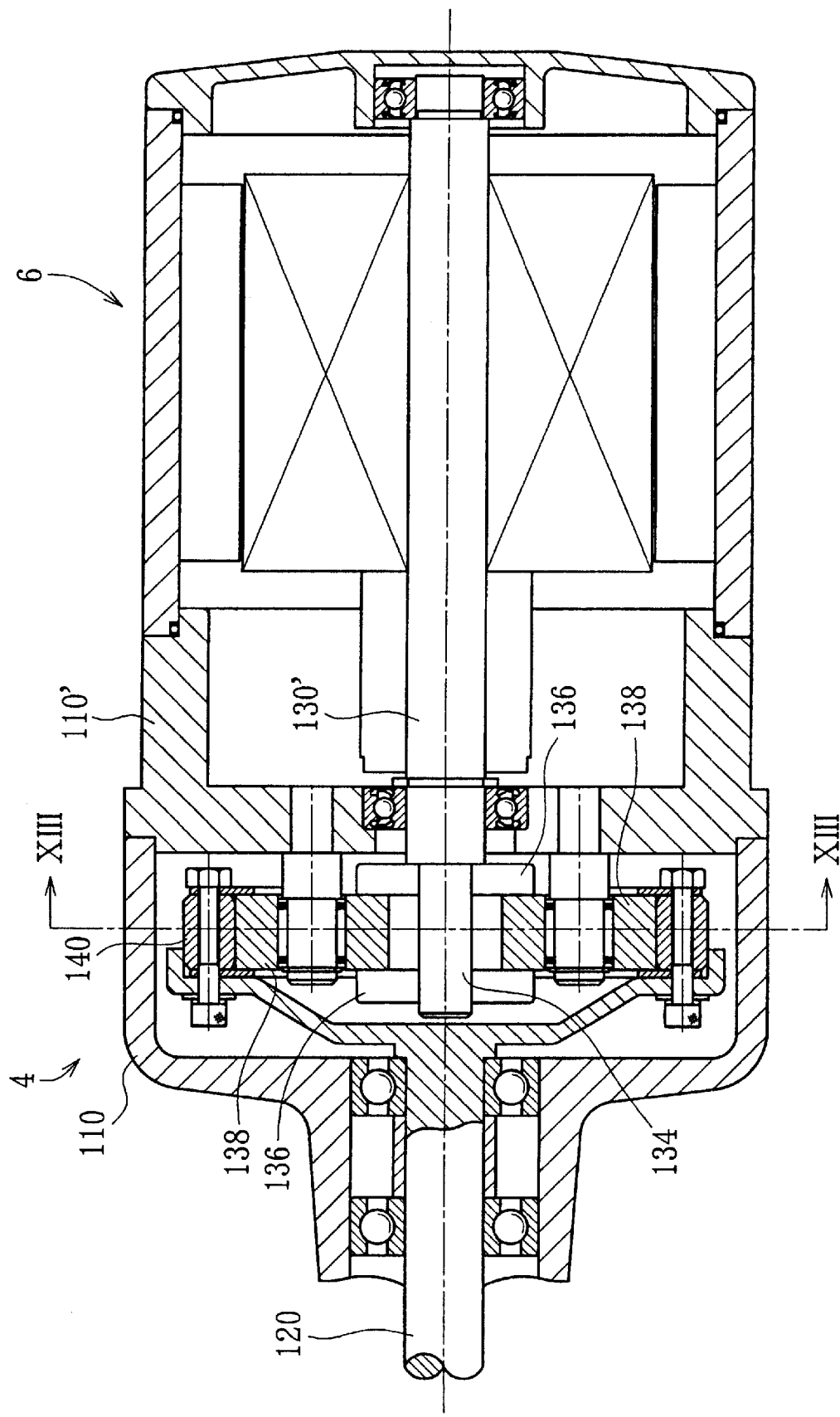
FIG. 12 is a longitudinal cross sectional view of a gear assembly for a wind driven electrical power generating apparatus.
Figure 13:
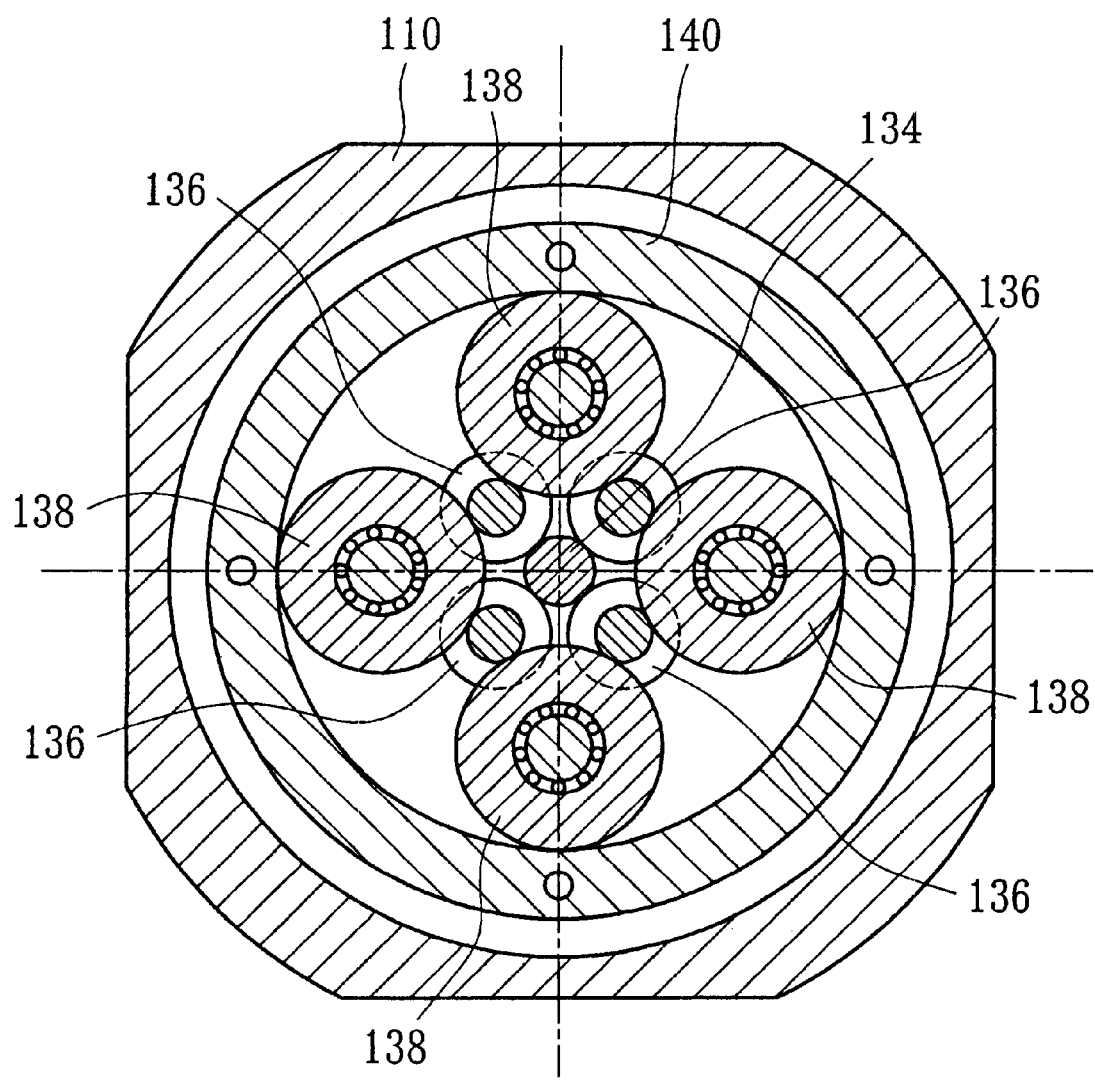
FIG. 13 is a cross sectional view of the structure shown in FIG. 10, taken along the line XIII—XIII.
Figure 14:
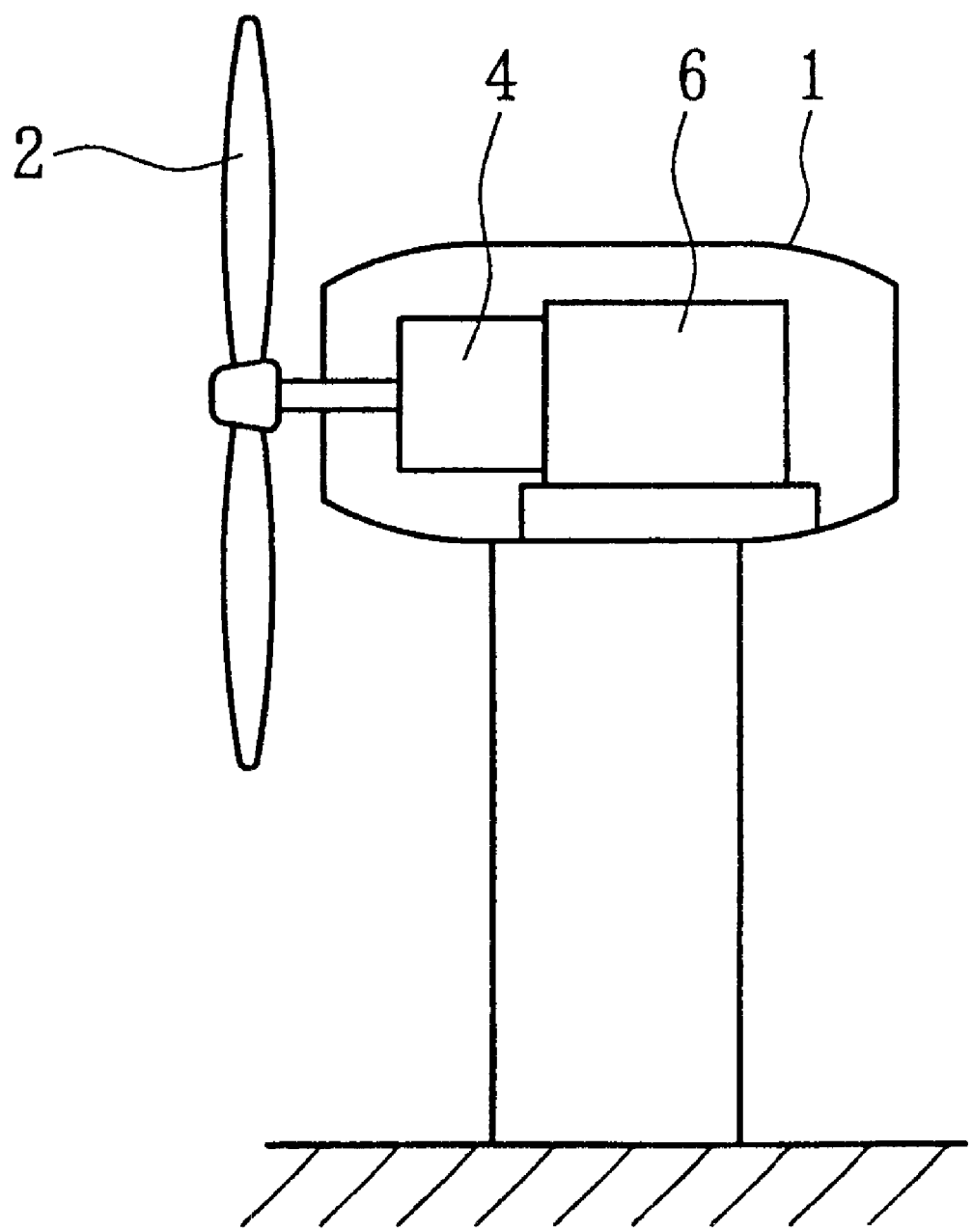
FIG. 14 is a schematic elevation of a wind driven electrical power generating apparatus.

FIGS. 12 to 14 illustrate the embodiment employing the configuration that a gear assembly 4 and a generator 6 are connected integrally with each other. That is, in this embodiment, a sun roller 134 is formed on a rotating shaft 130' of the generator 6 and pins 126 for supporting a second roller 138 are mounted in a generator casing 110'.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A wind driven electrical power generating apparatus comprising:
    a rotor rotating by receiving wind force;
    a gear assembly having an output shaft and an input shaft, the input shaft being connected to said rotor;
    a generator connected to the output shaft of said gear assembly;
    a sensor for detecting a generating capacity of said generator; and
    a controller for varying a gear ratio of the gear assembly in accordance with a signal from the sensor to control the generator to keep rotating at around a lowest rotational speed within a range of rotational speed, said range being determined so as to include a maximum power operation region of said generator.

2. A wind driven electrical power generating apparatus comprising:
    a rotor rotating by receiving wind force;
    a gear assembly having an output shaft and an input shaft, the input shaft being connected to said rotor;
    a generator connected to the output shaft of said gear assembly;
    a sensor for detecting parameters representing an output power of said generator; and
    a controller for varying a gear ratio of the gear assembly in accordance with a signal from the sensor to control said output shaft of said gear assembly to rotate at around a lowest rotational speed within a range of rotational speed, said range being determined so as to include a rated power region as an upper operational limit.

3. The wind driven electrical power generating apparatus according to claim 1 or claim 2, wherein said sensor is a rotary sensor.

4. The wind driven electrical power generating apparatus according to claim 1 or claim 2, wherein said gear assembly is a planetary roller type traction drive gear assembly.

* * * * *